(12) United States Patent
Nakagawa (10) Patent No.: US 12,501,891 B2
(45) Date of Patent: Dec. 23, 2025

(54) REEL SEAT

(71) Applicant: GLOBERIDE, Inc., Higashikurume (JP)

(72) Inventor: Shintaro Nakagawa, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 19/068,935

(22) Filed: Mar. 3, 2025

(65) Prior Publication Data

US 2025/0351808 A1 Nov. 20, 2025

(30) Foreign Application Priority Data

May 15, 2024 (JP) .................................. 2024-079371

(51) Int. Cl.
*A01K 87/06* (2006.01)
(52) U.S. Cl.
CPC .................................... *A01K 87/06* (2013.01)
(58) Field of Classification Search
CPC ........................................................ A01K 87/06
See application file for complete search history.

(56) References Cited

U.S. PATENT DOCUMENTS

2024/0147977 A1* 5/2024 Omura ................... A01K 87/08

FOREIGN PATENT DOCUMENTS

JP 2000-333563 A 12/2000

* cited by examiner

*Primary Examiner* — Richard G Davis
(74) *Attorney, Agent, or Firm* — Oliff PLC (57) ABSTRACT

A reel seat includes a seat main body including a reel leg placement portion, a fixed hood formed on one end side of the placement portion in an axial direction and fixes one end of the reel leg, and a male screw portion formed on another end side of the placement portion in the axial direction. A nut member that is screwed to the male screw portion and a floating hood that approaches/separates from the fixed hood by a rotation operation of the nut member are disposed in the seat main body, and an abutment locking surface against which an end surface of the nut member abuts when the nut member is fastened by the rotation operation is formed at an end portion on the placement portion side of unevenness of the male screw portion. The abutment locking surface is formed in a semicircular region on the placement portion side.

6 Claims, 9 Drawing Sheets

REEL SEAT

CROSS-REFERENCE TO RELATED APPLICATION

This application claims priority under 35 U.S.C. § 119 to Japanese Patent Application No. 2024-079371 filed on May 15, 2024 in the Japanese Patent Office, the entire contents of each hereby incorporated by reference.

BACK GROUND OF THE INVENTION

1. Technical Field

The present invention relates to a reel seat on which a fishing reel is mounted.

2. Description of the Related Art

In the related art, a fishing rod on which various fishing reels are mounted is provided with a reel seat on a base end side. Generally, the reel seat includes a fixed hood to which one end of a reel leg is fitted, and a floating hood to which the other end of the reel leg is fitted. The floating hood is moved in an axial direction to approach/separate from the fixed hood by the rotation operation of a nut member, and the fishing reel can be attached to and detached from the fixed hood.

For example, as disclosed in JP 2000-333563 A, the reel seat includes a cylindrical seat main body externally fitted to a rod on the base end side. In the seat main body, a male screw portion is formed on one end side, a fixed hood is provided on the other end side, and a floating hood is attached to the male screw portion. The floating hood is moved in the axial direction without being rotated by a rotation operation of the nut member screwed to the male screw portion and an anti-rotation structure, and approaches/separates from the fixed hood as described above.

SUMMARY OF THE INVENTION

In the structure in which the floating hood approaches/separates from the fixed hood by the rotation operation of the nut member as described above, in a case where the movement of the nut member is not restricted, the seat main body is damaged such as getting on the seat main body portion, and the appearance deteriorates. In addition, JP 2000-333563 A discloses a configuration in which the nut member is provided with a connection structure that connects to the floating hood, and a distal end of the connection structure can abut against the seat main body. However, there is room for improvement in reducing the weight while preventing deterioration in appearance and improving gripping comfort.

An object of the present invention is to provide a reel seat that can be reduced in weight without deterioration of appearance and has good gripping comfort.

In order to achieve the object, a reel seat according to an aspect of the present invention comprises a seat main body comprising a reel leg placement portion on which a reel leg of a fishing reel is placed, a fixed hood that is formed on one end side of the reel leg placement portion in an axial direction and fixes one end of the reel leg, and a male screw portion formed on another end side of the reel leg placement portion in the axial direction, in which a nut member that is screwed to the male screw portion and a floating hood that approaches/separates from the fixed hood by a rotation operation of the nut member are disposed in the seat main body, an abutment locking surface against which an end surface of the nut member abuts when the nut member is fastened by the rotation operation is formed at an end portion on the reel leg placement portion side of unevenness of the male screw portion, and the abutment locking surface is formed in a semicircular region on the reel leg placement portion side with respect to 360° of a range of the rotation operation of the nut member in a circumferential direction.

In the reel seat described above, when the nut member that moves the floating hood in the axial direction is rotated in the fastening direction, the nut member abuts against the abutment locking surface formed on the seat main body, and thereby the movement of the nut member in the axial direction is restricted. In a case where the nut member abuts against the abutment locking surface, the nut member is prevented from getting on the seat main body, a scratch is not formed on the surface of the seat main body, and the appearance does not deteriorate. In addition, since the abutment locking surface is formed at the end portion on the reel leg placement portion side of the unevenness of the male screw portion, the length in the axial direction can be shortened, and the weight can be reduced. Furthermore, since such an abutment locking surface is formed in the semicircular region on the reel leg placement portion side with respect to 360° of the range of the rotation operation of the nut member in the circumferential direction, it is possible to reduce the diameter of the portion to be gripped, and it is possible to obtain a reel seat having good gripping property.

According to the present invention, it is possible to obtain a reel seat that can be reduced in weight without deterioration of appearance and has good gripping comfort.

DETAILED DESCRIPTION

Figure 2:
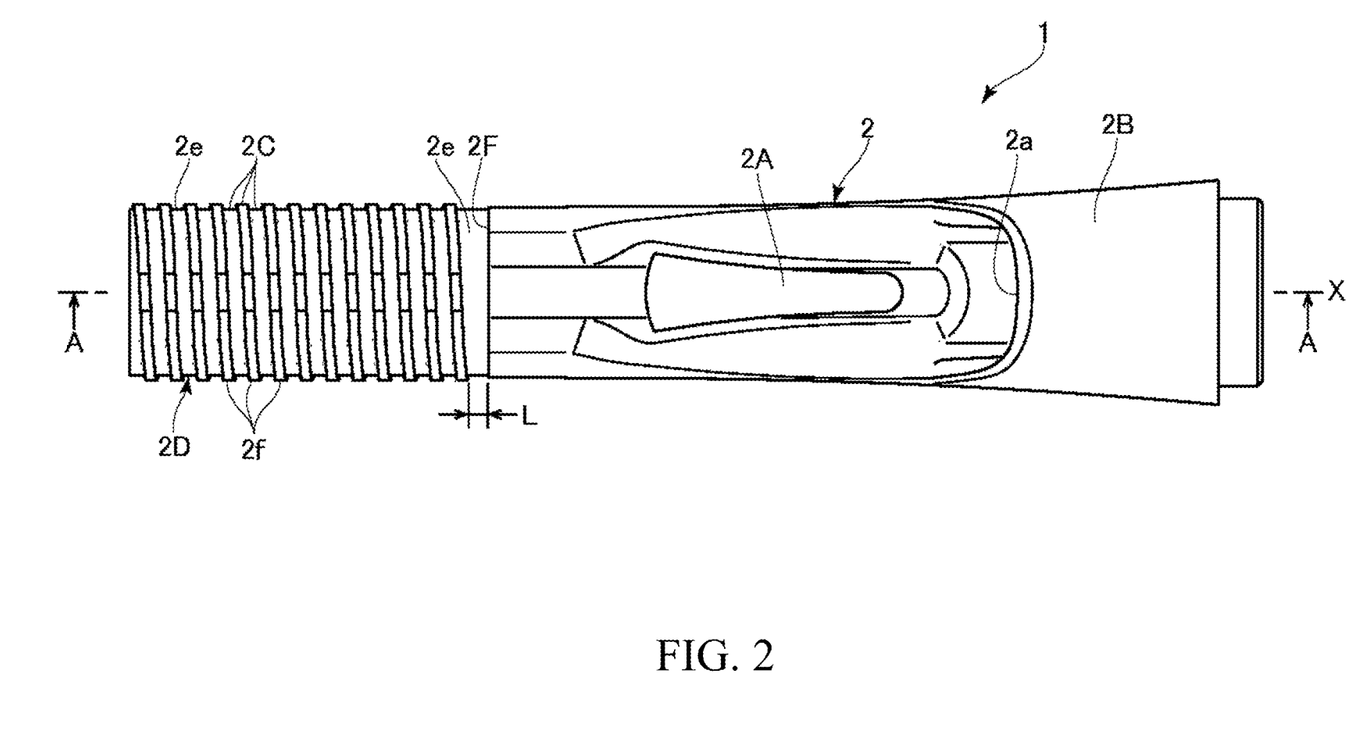
FIG. 2 is a plan view of the reel seat of FIG. 1.
Figure 11:
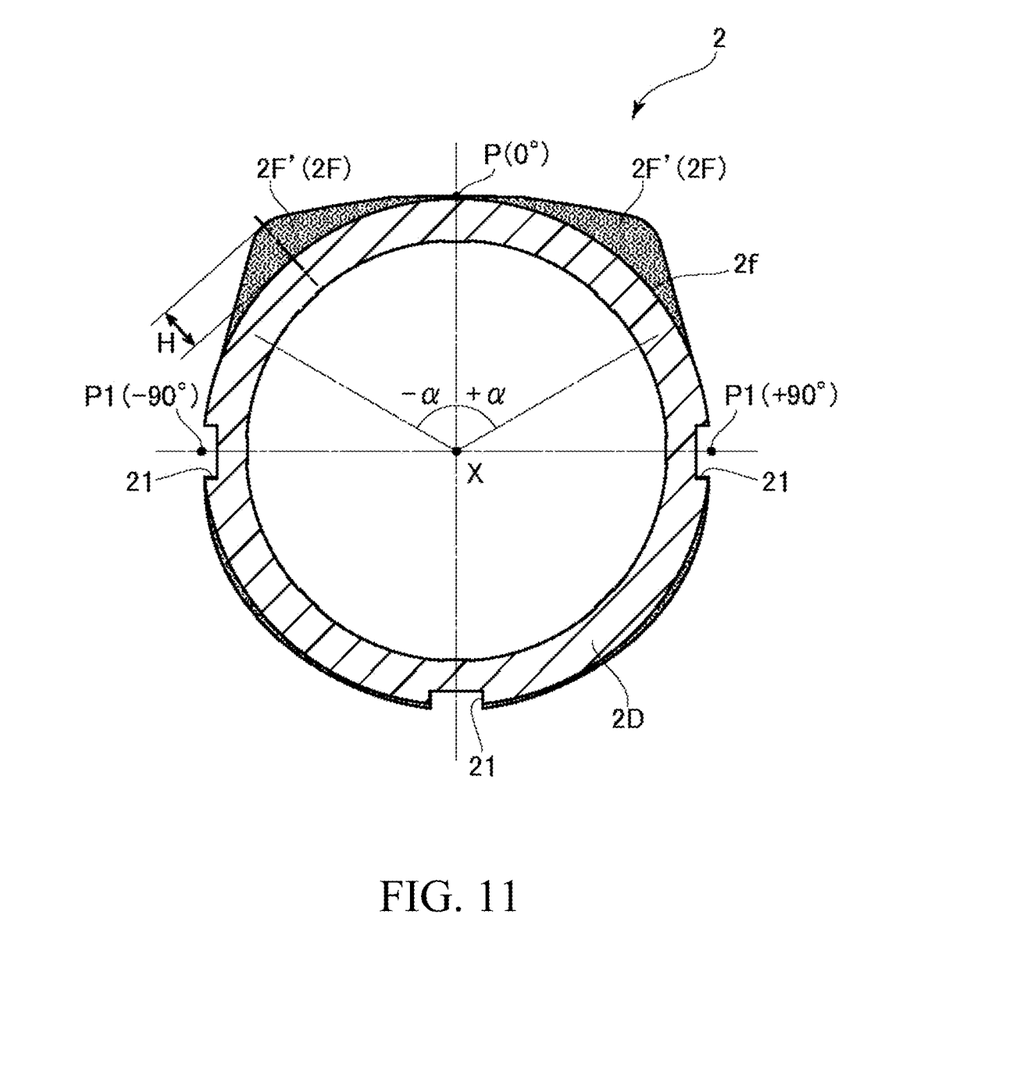
FIG. 11 is a cross-sectional view taken along line D-D of FIG. 10A.

Hereinafter, an embodiment of a reel seat according to the present invention will be specifically described with reference to the accompanying drawings. Note that in the embodiment described below, an axial direction (X) means a central axis of a seat main body of the reel seat (an axis of a rod to be fitted) as illustrated in FIG. 2, and a nut member and a floating hood mounted on the seat main body are moved integrally in the axial direction X. In addition, when the position of the seat main body in a circumferential direction is specified, as illustrated in FIG. 11, when viewed from the axial direction, a center position P of a reel leg placement portion on which a reel leg of a fishing reel is placed is defined as 0°, and by using both side positions P1 and P2 at ±90° of the center position as a reference, a side where the reel leg placement portion is formed is defined as a semicircular region on a reel leg placement portion side and a side where the reel leg placement portion is not formed is defined as a semicircular region on an opposite-reel leg placement portion side.

Figure 1:
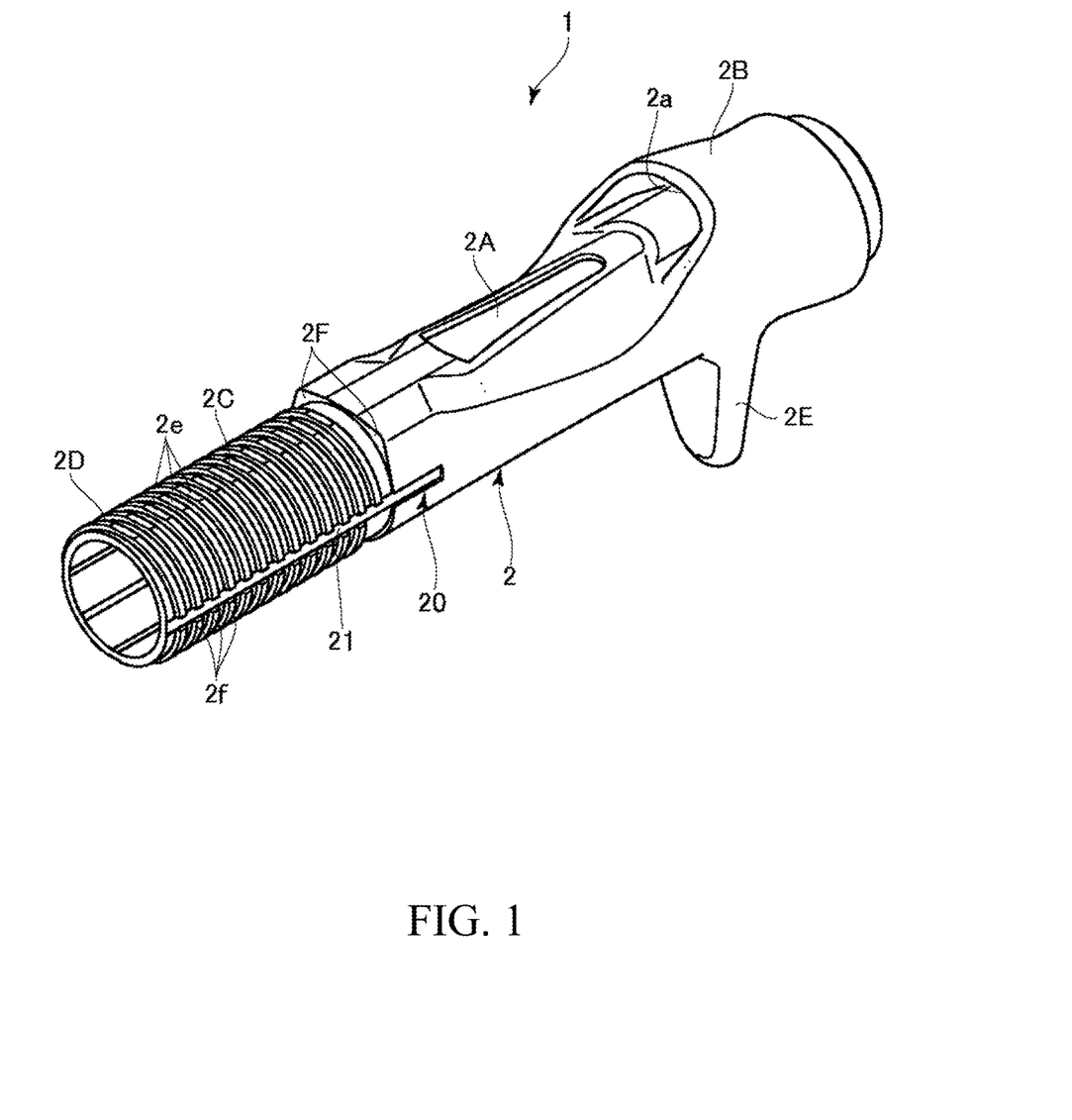
FIG. 1 is a perspective view illustrating an overall configuration of an embodiment of a reel seat according to the present invention.
Figure 3:
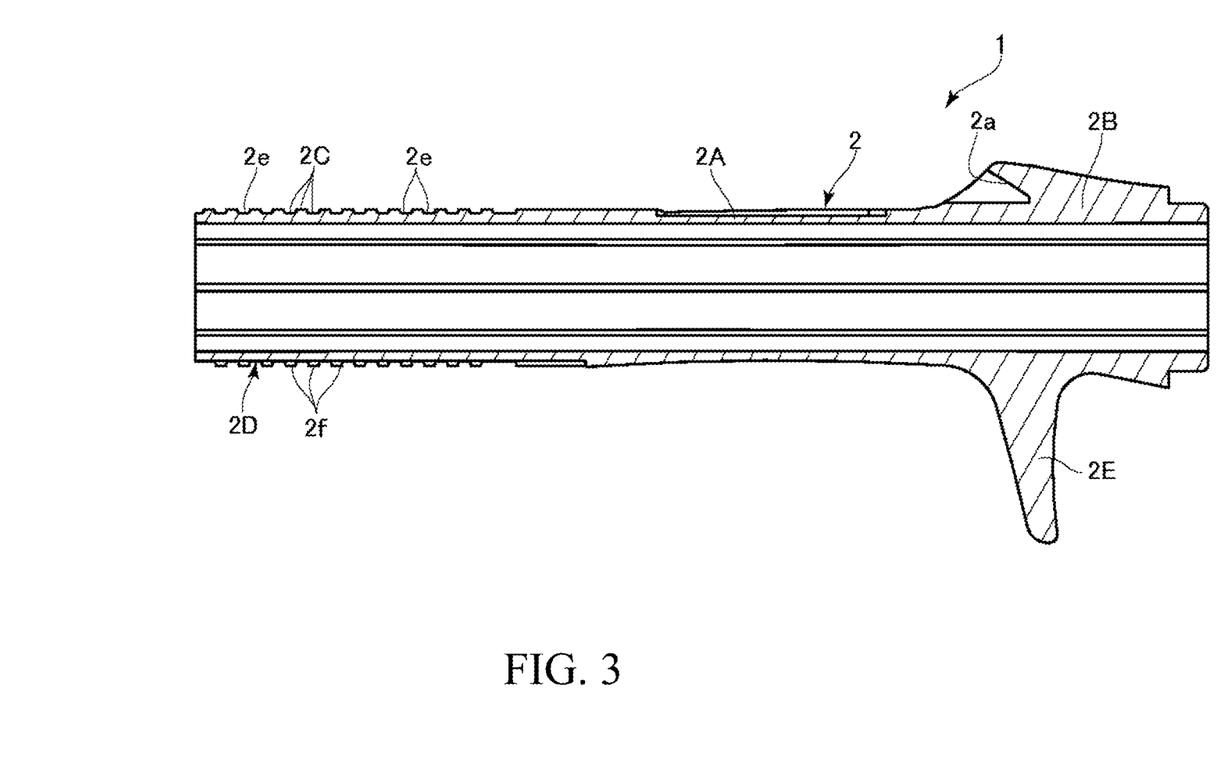
FIG. 3 is a cross-sectional view taken along line A-A of FIG. 2.

As illustrated in FIGS. 1 to 3, a reel seat 1 according to the present embodiment comprises a cylindrical seat main body 2 (hereinafter, referred to as a main body) to be fitted into a rod (not illustrated) on the base end side of a fishing rod. The main body 2 is integrally formed of, for example, synthetic resin, metal, or the like, and comprises a reel leg placement portion 2A on which the reel leg of various fishing reels is placed, a fixed hood 2B that is formed on one end side of the reel leg placement portion 2A in the axial direction and fixes one end of the reel leg, and a cylindrical portion 2D that protrudes to another end side of the reel leg placement portion 2A in the axial direction and is formed with a male screw portion 2C on an outer peripheral surface. Note that the reel seat of the present embodiment is configured as a type to which a dual-bearing reel is attached, and the main body 2 is provided with a trigger 2E on a side opposite to the reel leg placement portion 2A so as to facilitate a casting operation in addition to the above-described components.

Figure 4:
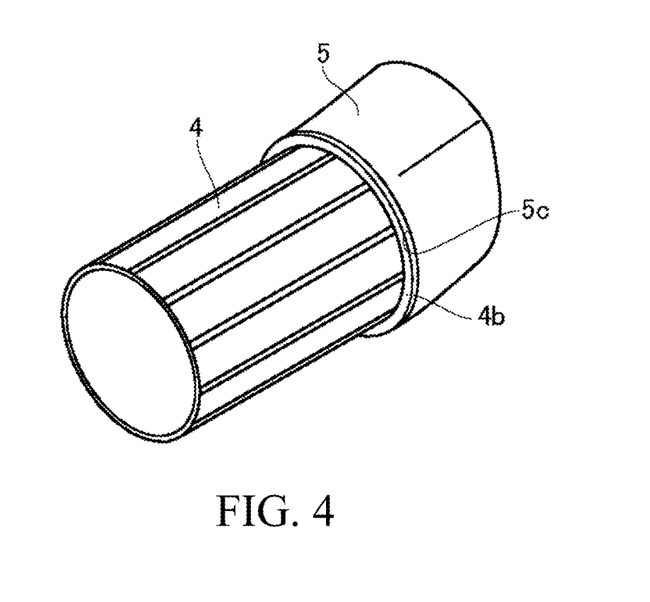
FIG. 4 is a perspective view illustrating a configuration of a floating hood and a nut member mounted on a reel seat.
Figure 5:
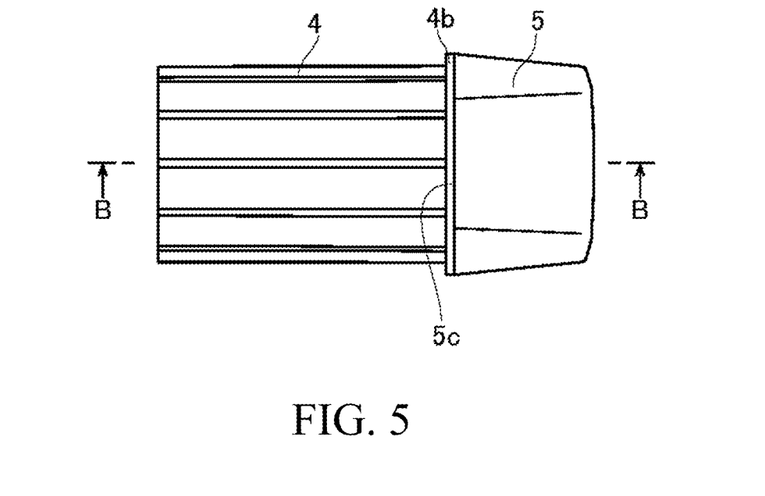
FIG. 5 is a plan view of the floating hood and the nut member of FIG. 4.
Figure 6:
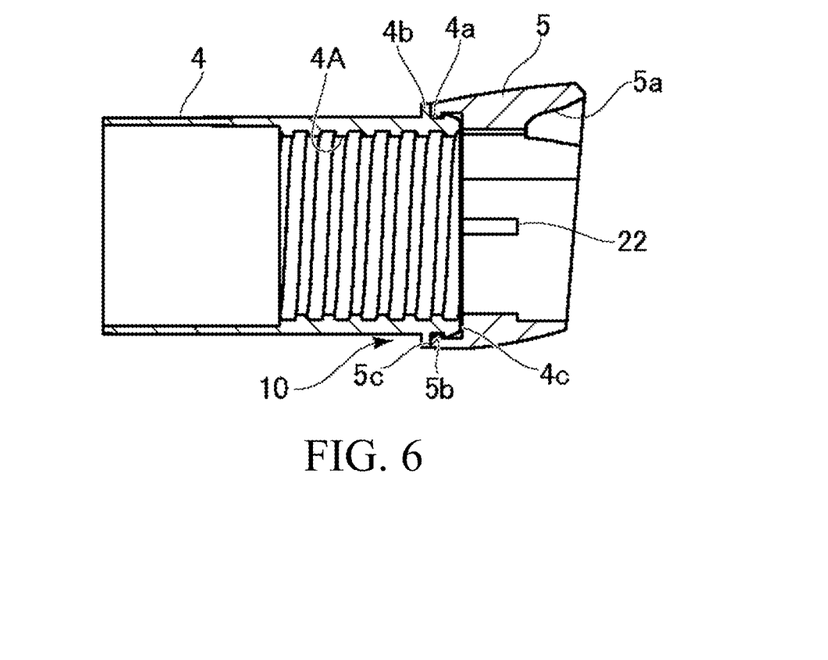
FIG. 6 is a cross-sectional view taken along line B-B of FIG. 5.

As illustrated in FIGS. 4 to 6, the main body 2 is provided with a cylindrical nut member 4 formed with a female screw portion 4A screwed to the male screw portion 2C, and a floating hood 5 that approaches/separates from the fixed hood 2B along the axial direction when the nut member 4 is rotated. The floating hood 5 is integrated with the nut member 4 by an engagement structure (connection structure) 10 provided between the floating hood 5 and the nut member 4, and is configured to be integrally movable in the axial direction when the nut member 4 is moved in the axial direction due to a screwing relationship between the male screw portion 2C and the female screw portion 4A when the nut member 4 is rotated. Note that a flexible member or the like may be attached to the outer peripheral surface of the nut member 4.

Figure 7:
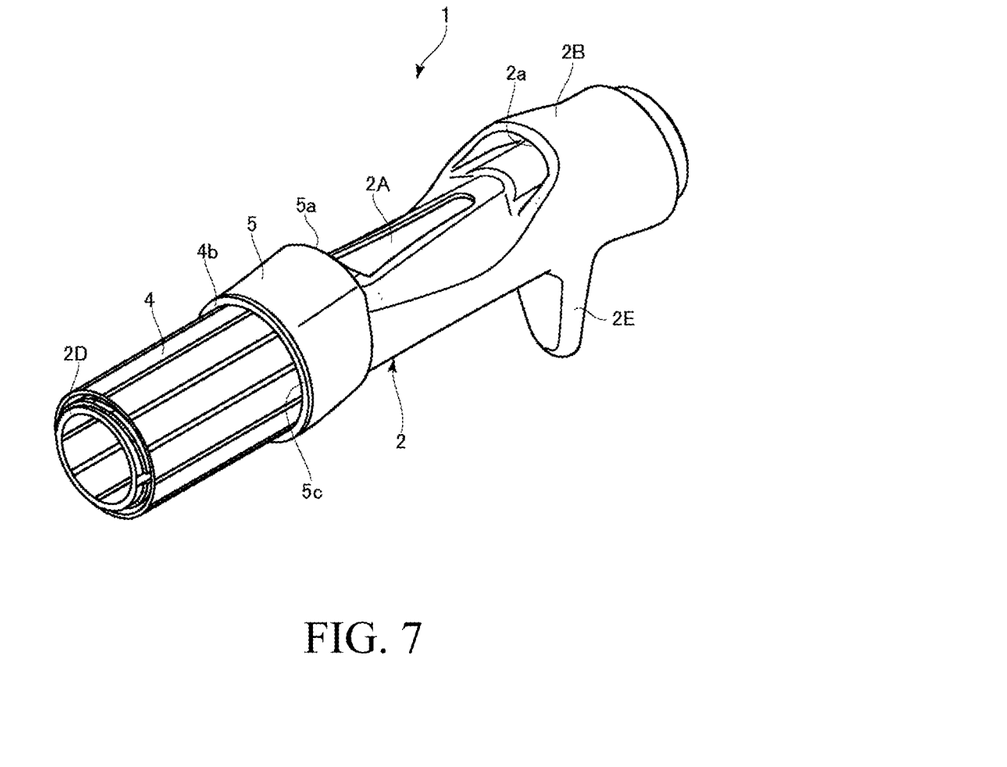
FIG. 7 is a perspective view in which the floating hood and the nut member are mounted on a reel seat.
Figure 8:
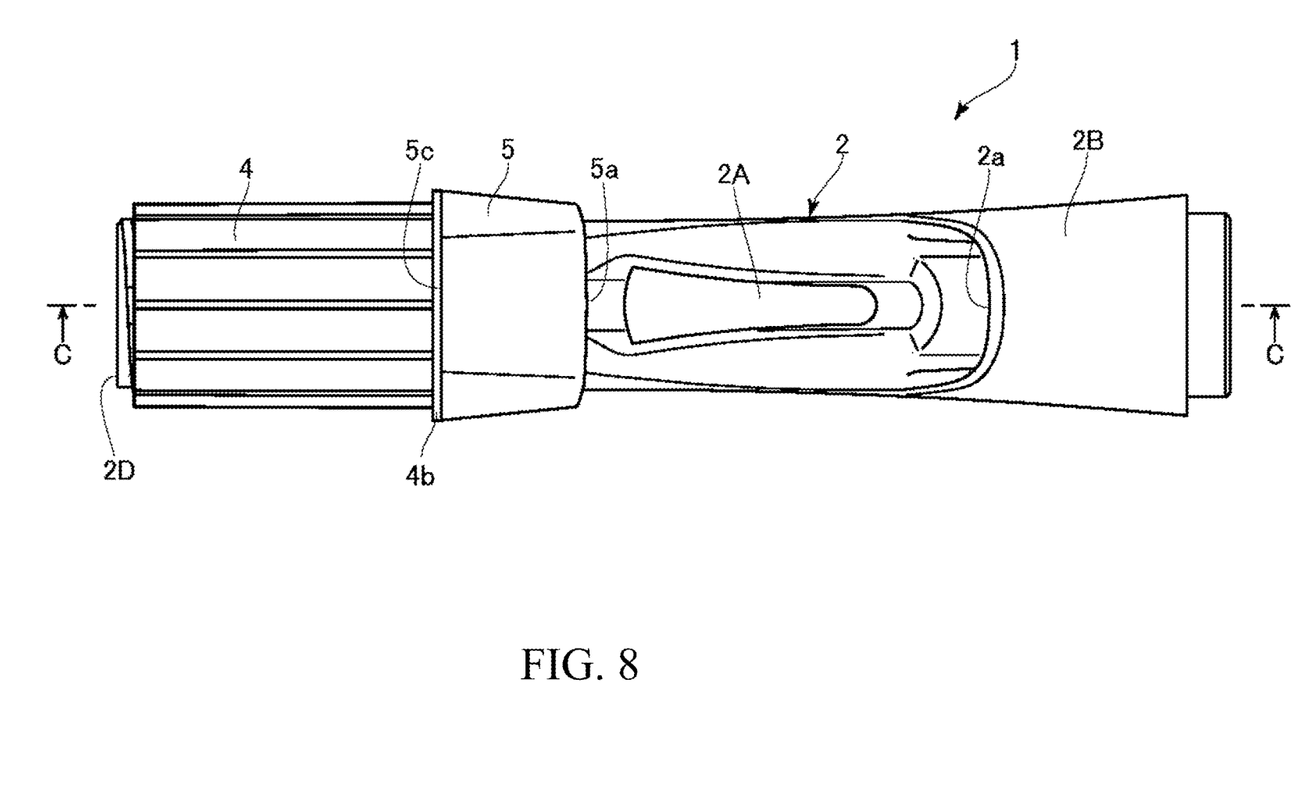
FIG. 8 is a plan view in which the floating hood and the nut member are mounted on a reel seat.
Figure 9:
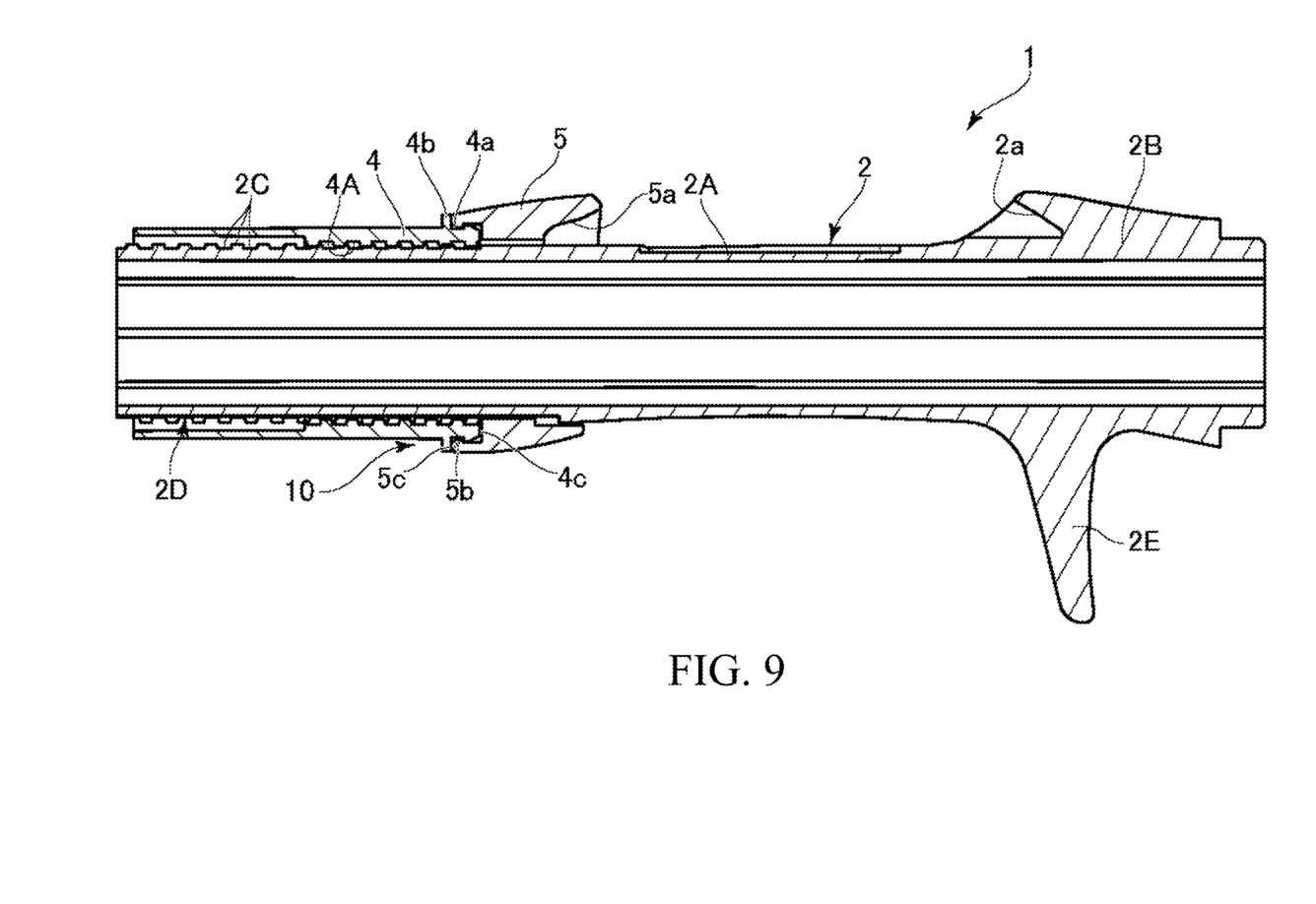
FIG. 9 is a cross-sectional view taken along line C-C of FIG. 8.

As illustrated in FIGS. 7 to 9, an opening 2a and an opening 5a for receiving the reel leg are formed in facing portions of the fixed hood 2B and the floating hood 5, respectively. Therefore, in a case where the nut member 4 is rotated in a fastening direction, the floating hood 5 approaches the fixed hood 2B, and the reel leg of the fishing reel is fastened and fixed between the openings 2a and 5a. In addition, in a case where the nut member 4 is rotated in a reverse-fastening direction, the floating hood 5 separates from the fixed hood 2B, and the reel leg of the fishing reel is detachable from the reel leg placement portion 2A.

An anti-rotation structure 20 is provided between the main body 2 and the floating hood 5 such that the floating hood 5 is not rotated together when the nut member 4 is rotated. As is known, the anti-rotation structure 20 comprises a guide groove 21 formed along the axial direction on the outer peripheral surface of the main body 2, and a protrusion portion 22 formed on an inner surface of the floating hood 5 and engaged with the guide groove 21. Although the formation position of the guide groove 21 is not limited, in the present embodiment, the guide groove 21 having a predetermined range (corresponding to the moving length of the floating hood 5) along the axial direction X is formed at three positions of the both side positions P1 and P2 and a lower end position P3 of the main body 2, and the protrusion portion 22 integrally formed on the inner surface of the floating hood 5 is engaged with the guide groove 21.

As a result, in a case where the nut member 4 is rotated, the floating hood 5 is moved along the axial direction X without being rotated with respect to the main body 2. In addition, the movement of the guide groove 21 in the axial direction is restricted by an abutment locking surface 2F described later without abutting the protrusion portion 22 against the end portion thereof, and the guide groove 21 has a release function. Therefore, it is not necessary to strictly manage the length dimension of the guide groove 21.

The engagement structure 10 engages the nut member 4 and the floating hood 5 such that the nut member 4 and the floating hood 5 are integrally movable in the axial direction. In addition, the nut member 4 is configured to be rotatable relative to the floating hood 5.

Here, the engagement structure 10 will be described with reference to FIG. 6. The engagement structure 10 of the present embodiment comprises an annular recess portion 4a formed on the outer surface on the end portion side of the nut member 4, an annular protrusion portion 5b formed on the inner surface on the end portion side of the floating hood 5 and fitted to the annular recess portion 4a, and an annular flange 4b formed adjacent to the annular recess portion 4a of the nut member 4. In a case where the annular recess portion 4a of the nut member 4 and the annular protrusion portion 5b of the floating hood 5 are fitted to each other, the flange 4b is brought into contact with an opening end edge 5c of the floating hood 5.

Figure 10A:
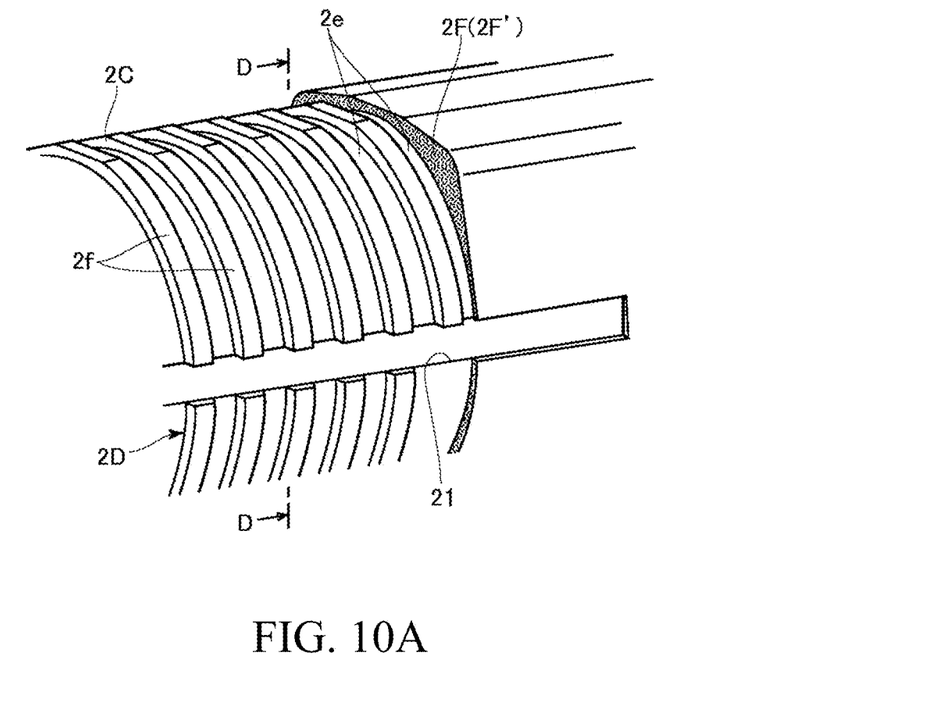
FIG. 10A is a perspective view illustrating an abutment locking surface formed on the reel seat.
Figure 10B:
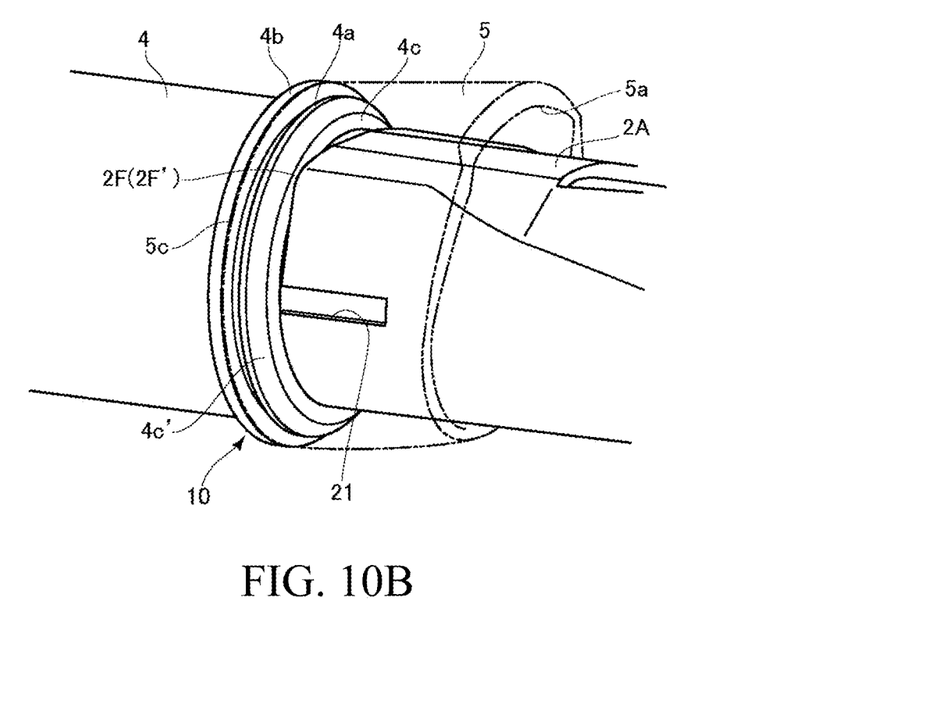
FIG. 10B is a perspective view of FIG. 10A as viewed from the opposite side in an axial direction.

The annular recess portion 4a and the annular protrusion portion 5b are fitted by aligning opening end edges 4c and 5c of the nut member 4 and the floating hood 5 and fitting the opening end edges 4c and 5c along the axial direction X. Therefore, it is preferable to form, on the opening end edge 4c of the nut member 4, an inclined surface 4c' (FIG. 10B) that gradually increases in diameter along the axial direction toward the annular recess portion 4a. In addition, it is preferable to form, on the opening end edge 5c of the floating hood 5, an inclined surface that gradually increases in diameter toward the opening side of the annular protrusion portion 5b such that the annular protrusion portion 5b can be easily fitted to the annular recess portion 4a.

In this manner, the inclined surfaces are formed at the portions of the opening end edges 4c and 5c of the nut member 4 and the floating hood 5, and thus the nut member 4 and the floating hood 5 can be easily fitted and integrated in the axial direction.

In addition, an abutment locking surface (hereinafter, referred to as a locking surface) 2F against which an end surface of the nut member abuts when the nut member 4 is fastened by rotational operation is formed at an end portion on the reel leg placement portion 2A side of unevenness (recess 2e and protrusion 2f) constituting the male screw portion 2C formed in the main body 2.

The locking surface 2F only needs to be configured such that the opening end edge 4c of the nut member 4 abuts when the nut member 4 is fastened by the rotation operation so that the locking surface 2F prevents further advancement. For example, the locking surface 2F can be configured by a vertical surface extending in a direction perpendicular to the axial direction X.

That is, by forming such a locking surface 2F, when the nut member 4 is fastened by the rotation operation, the movement of the opening end edge 4c of the nut member 4 in the axial direction can be restricted, and the nut member is prevented from getting on the seat main body 2. Therefore, in a case where the fishing reel is replaced, even when the nut member 4 is loosened and the male screw portion 2C is exposed, a scratch or the like is not formed on the surface (conspicuous portion) of the end region, so that deterioration in appearance can be prevented. In this case, a scratch or the like may occur in the region of the locking surface 2F and the opening end edge 4c of the nut member 4, but this portion is a portion that is difficult to visually recognize and does not affect the appearance.

In addition, since the locking surface 2F is formed to be continuous with the male screw portion 2C in the axial direction (the opening end edge 4c of the nut member 4 directly abuts against the locking surface 2F to be restricted), the length of the main body 2 in the axial direction can be reduced (shortened), and the weight can be reduced. Specifically, a distance L (FIG. 2) between the recess 2e of the male screw portion 2C on the reel leg placement portion 2A side and the locking surface 2F in the axial direction may be set to about 2.0 to 3.6 mm, and thereby it is possible to effectively improve the appearance and reduce the weight.

In addition, the locking surface 2F is formed in a semicircular region on the reel leg placement portion 2A side with respect to 360° of a range of the rotation operation of the nut member 4 in the circumferential direction. Specifically, the locking surface 2F is formed in a semicircular region (semicircular region above a diameter Y connecting P1 and P2 in FIG. 11) on the reel leg placement portion side, which is a side where the reel leg placement portion 2A is formed, relative to the both side positions P1 and P2 illustrated in FIG. 11.

As described above, by limiting the formation position of the locking surface 2F to the semicircular region on the reel leg placement portion side, the diameter of the semicircular region on the opposite-reel leg placement portion side can be reduced by suppressing the increase in diameter, and the gripping property does not deteriorate. Specifically, in the configuration in which the dual-bearing reel is mounted, it is possible to suppress bulging of the palmar regions of the middle, ring, and little fingers, and thus it is possible to obtain the gripping comfort and to reduce the weight. In addition, in the configuration in which a spinning reel is attached, since the floating hood portion is covered by the palmar regions of the middle, ring, and little fingers and gripped at the base of the thumb, it is possible to suppress an increase of the diameter at the base of the thumb and to reduce the diameter.

In the present embodiment, at least a part of the locking surface 2F is formed to bulge in the radial direction from the outer peripheral surface of the protrusion 2f of the male screw portion 2C as illustrated in FIG. 11. In this manner, by bulging the locking surface 2F in the radial direction from the outer peripheral surface of the protrusion 2f of the male screw portion 2C, it is possible to reliably prevent the nut member 4 from getting on the main body 2 when the nut member 4 is fastened by the rotation operation.

In this case, when a bulging amount H of the locking surface 2F in the radial direction with respect to the outer peripheral surface of the protrusion 2f is larger than 0 mm, getting on can be prevented, and by setting the bulging amount H to 2.5 mm or less at the maximum (0 mm<H≤2.5 mm), it is possible to suppress the increase in diameter also on the reel leg placement portion side.

In addition, in a case where the portion that bulges (bulging portion 2F') is formed at the both side positions P1 and P2, gripping comfort tends to deteriorate. Therefore, in a case where the center position (top position) P of the reel leg placement portion is set to 0° when the reel seat (main body 2) is viewed from the axial direction, a forming angle α of the bulging portion 2F' is preferably set within a range of ±60°. That is, by forming the bulging portion 2F' in such a range, in the circumferential direction, unnecessary thickening of the portion that extends from a region where the reel leg placement portion is formed is avoided, and thus the gripping comfort can be improved.

Note that the bulging portion 2F' is preferably formed in a region that does not include the center position P of 0° and both side positions P1 and P2 of ±90° in a case where the center position of the reel leg placement portion 2A is set to 0° when the reel seat is viewed from the axial direction. That is, as illustrated in FIG. 11, since the bulging portion is not formed at the top position P of 0° and the both side positions P1 and P2 of ±90° (the bulging amount may be small), it is easy to reduce the diameters of the main body 2 and the nut member 4, and it is possible to improve the gripping comfort when the reel seat is gripped and held.

Although the embodiments of the present invention have been described above, the reel seat according to the present invention is not limited to the above-described embodiments, and can be appropriately modified and implemented. The above-described floating hood 5 may be disposed on the rod tip side or the rod butt side of the fishing rod. In addition, constituent materials and forms of the main body 2, the nut member 4, and the floating hood 5, and the engagement structure 10 can be appropriately modified. In addition, the abutment locking surface may not be in the direction perpendicular to the axial direction, and the height thereof may be about the same as or lower than the outer peripheral surface of the protrusion 2f of the male screw portion 2C. In addition, the shape and the number of formed bulging portions constituting the abutment locking surface can also be appropriately modified. Furthermore, each component of the above-described reel seat can be appropriately combined and implemented, and such a reel seat can be mounted on various fishing rods. In this case, the configuration of the fishing rod is not limited to a specific fishing rod as long as the fishing rod can discharge a fishing line from the mounted fishing reel.

REFERENCE SIGNS LIST

1 Reel seat
2 Main body (seat main body)
2A Reel leg placement portion
2B Fixed hood
2C Male screw portion
2D Cylindrical portion
2e Recess
2f Protrusion
2F Abutment locking surface
4 Nut member
5 Floating hood
10 Engagement structure

What is claimed is:
1. A reel seat comprising:
a seat main body comprising a reel leg placement portion on which a reel leg of a fishing reel is placed, a fixed hood that is formed on one end side of the reel leg placement portion in an axial direction and fixes one end of the reel leg, and a male screw portion formed on another end side of the reel leg placement portion in the axial direction, wherein a nut member that is screwed to the male screw portion and a floating hood that approaches/separates from the fixed hood by a rotation operation of the nut member are disposed in the seat main body, an abutment locking surface against which an end surface of the nut member abuts when the nut member is fastened by the rotation operation is formed at an end portion on the reel leg placement portion side of unevenness of the male screw portion, and the abutment locking surface is formed in a semicircular region on the reel leg placement portion side with respect to 360° of a range of the rotation operation of the nut member in a circumferential direction.

2. The reel seat according to claim 1, wherein at least a part of the abutment locking surface bulges in a radial direction from an outer peripheral surface of a protrusion of the male screw portion.

3. The reel seat according to claim 2, wherein the portion that bulges is formed in a range of ±60° in a case where a center position of the reel leg placement portion is set to 0° when the reel seat is viewed from the axial direction.

4. The reel seat according to claim 2, wherein a bulging amount H of the abutment locking surface in the radial direction with respect to the outer peripheral surface of the protrusion of the male screw portion is 0 mm<H≤2.5 mm.

5. The reel seat according to claim 4, wherein the portion that bulges is formed at a position other than a position of 0° and positions of ±90° in a case where a center position of the reel leg placement portion is set to 0° when the reel seat is viewed from the axial direction.

6. A fishing rod on which the reel seat according to claim 1 is mounted.

* * * * *